(12) United States Patent
Addy et al.

(10) Patent No.: US 7,321,788 B2
(45) Date of Patent: Jan. 22, 2008

(54) SYNCHRONIZING RF SYSTEM

(75) Inventors: Kenneth L. Addy, Massapequa, NY (US); Steven J. Winick, Woodmere, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/659,952

(22) Filed: Sep. 11, 2003

(65) Prior Publication Data
US 2005/0059436 A1    Mar. 17, 2005

(51) Int. Cl.
*H04B 1/38* (2006.01)
(52) U.S. Cl. ............... 455/574; 455/404.1; 340/539.3; 340/825.72; 370/315; 370/311
(58) Field of Classification Search ............ 455/404.1, 455/574, 127.5, 566; 370/311; 340/539, 340/825.72
See application file for complete search history.

(56) References Cited

U.S. PATENT DOCUMENTS

| | | | | |
|---|---|---|---|---|
| 5,107,488 | A | * | 4/1992 | Schreder et al. ............ 370/315 |
| 5,625,338 | A | * | 4/1997 | Pildner et al. ............ 340/539.3 |
| 5,991,279 | A | * | 11/1999 | Haugli et al. ............... 370/311 |
| 6,799,031 | B1 | * | 9/2004 | Lewiner et al. .......... 455/404.1 |
| 2001/0053710 | A1 | * | 12/2001 | Gibbons et al. ............. 455/574 |
| 2002/0140571 | A1 | * | 10/2002 | Hayes et al. ........... 340/825.72 |

FOREIGN PATENT DOCUMENTS

| | | |
|---|---|---|
| CA | 2337118 | 1/2001 |
| DE | 198 51 959 A1 | 5/2000 |
| EP | 0 615 364 A1 | 9/1994 |
| GB | 2 271 691 | 4/1994 |
| WO | WO 99/46745 A | 9/1999 |

* cited by examiner

*Primary Examiner*—Lester G. Kincaid
*Assistant Examiner*—Charles Shedrick
(74) *Attorney, Agent, or Firm*—Scully, Scott, Murphy & Presser, P.C.

(57) ABSTRACT

A synchronizing method and system between a Radio Frequency (RF) transmitter and a battery powered receiver wherein the transmitter transmits short duration first periodic sync signals which are used by the receiver to maintain proper synchronization of the receiver with the transmitter during second periodic wake-up windows for transmission of data. The receiver wakes for a short duration at the start of each periodic wake up window to receive a possible transmission of data, and if no transmission is received goes back to sleep, and if a transmission is received stays awake to receive the full transmission of data. The basic principle is that the average current consumed by the battery powered receiver in order to wake periodically to receive the first periodic sync signals and the second periodic data transmissions is less than the average current required to maintain the receiver awake continuously. The duration (e.g. 14 ms) and periodicity of (e.g. every 32 s) of the periodic signals are selected to meet a FCC regulation of 2 second/hour allowed for synchronization.

8 Claims, 1 Drawing Sheet

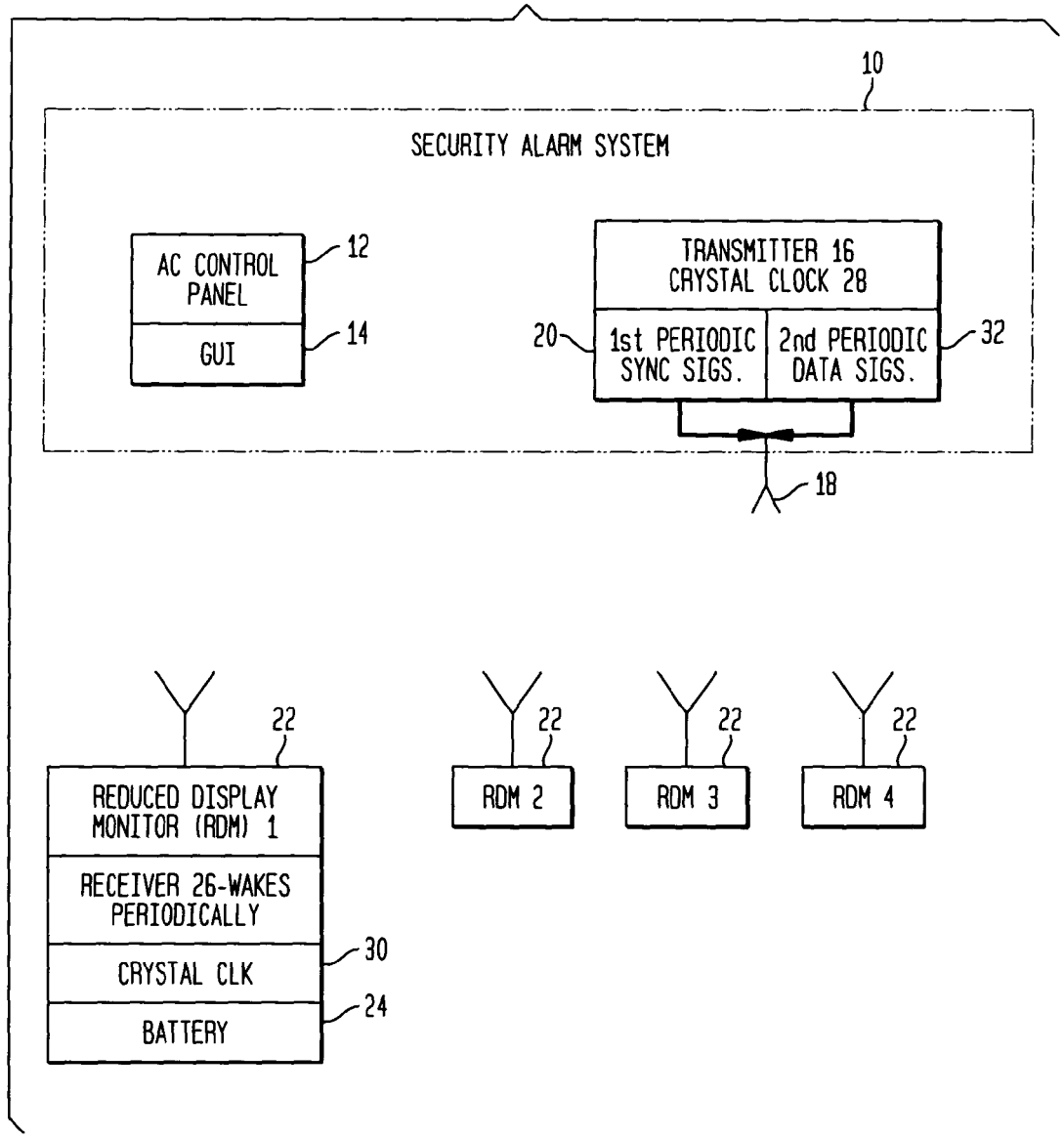
FIG.

SYNCHRONIZING RF SYSTEM

BACKGROUND OF THE INVENTION

1. Field of Invention

The present invention relates generally to synchronizing Radio Frequency (RF) methods and systems, and more particularly pertains to synchronizing RF methods and systems designed to extend the battery lifetime of battery powered RF receivers, particularly those operating in bands wherein the transmitter duty cycle is restricted.

2. Discussion of the Prior Art

The technique of transmitting periodic data messages and periodically waking a battery powered receiver to receive the periodic data messages is generally known in the art, and is used in RF communication systems wherein a battery or line powered transmitter transmits periodic messages to a battery powered receiver to extend the battery life in the receiver.

SUMMARY OF INVENTION

The present invention provides a synchronizing method and system between a Radio Frequency (RF) transmitter and receiver wherein the transmitter transmits short duration first periodic sync signals which are received and used by the receiver to maintain proper synchronization of the receiver with the transmitter during second periodic wake-up windows for transmission of data, such that the receiver will wake and be properly synchronized for possible wake up window data transmissions from the transmitter. The receiver wakes for a short duration at the start of each periodic wake up window to receive a possible transmission of data, and if no transmission is received goes back to sleep, and if a transmission is received stays awake to receive the full transmission of data. The basic principle is that the average current consumed by the battery powered receiver in order to wake periodically to receive the first periodic sync signals to maintain synchronization and to wake periodically to listen for the possible second periodic data transmissions is less than the average current required to maintain the receiver awake continuously.

BRIEF DESCRIPTION OF THE DRAWINGS

The foregoing objects and advantages of the present invention for a synchronizing RF system may be more readily understood by one skilled in the art with reference to FIG. 1 which illustrates one application of the present invention to a security alarm system wherein an AC powered control panel may provide a display of all pertinent parameters and conditions of the security alarm system, and also includes a local RF transmitter which transmits periodic RF messages on the present status of the security alarm system to a plurality of battery powered wireless keypads or Reduced Display Modules (RDMs).

DETAILED DESCRIPTION OF THE INVENTION

FIG. 1 illustrates one application of the present invention in a security alarm system 10, such as an Ademco security alarm system, wherein an AC powered control panel 12, such as an Ademco Quikmate™ control panel, is located within a building protected by the security alarm system. The control panel may provide a local display of all pertinent parameters and conditions of the security alarm system, and may also provide inputs, such as a Graphical User Interface (GUI) 12, to allow a user to enter data into and access and control the security alarm system.

The control panel can also include a local RF transmitter 16 which transmits over an antenna 18 periodic RF messages from 20 on the present status of the security alarm system to a plurality of battery powered wireless keypads or Reduced Display Modules (RDMs) 22, only one of which RDM1 is illustrated in detail, provided at a plurality of locations throughout the building. Each battery 24 powered RDM receives the local RF transmissions from the transmitter at the control panel, such that each wireless keypad RDM can also provide an accurate display of the present status of the security alarm system.

The following represents one designed embodiment of a wireless keypad RDM for use with a system control panel RF transmitter, with a reasonable response time being provided for reporting chime/entry beeps etc.

The Federal Communications Commission (FCC) in the USA in FCC Rule 15 allows up to 2 seconds of air-time to be transmitted per hour which can be used for the purposes of providing synchronization, polling, supervision etc. This additional 2 seconds does not significantly increase the system clash rate.

Pursuant to the present invention, these 2 seconds are used by the system control panel RF transmitter to send periodic sync (synchronization) messages from 20 to each battery 24 powered receiver 26 in each RDM 22. The periodicity of the sync messages is determined by the stability of the oscillator crystals in the clocks 28, 30 of the transmitter and receiver. In between the periodic sync messages, the transmitter and receiver are maintained synchronized to transmit/receive second periodic system messages and data from 32 during the same predetermined wake-up data transmission windows.

The transmitter 16 sends alarm or status messages only at the particular synchronized data transmission wake up windows or ticks. The periodicity of the synchronized data transmission wake up windows or ticks is 3 seconds, assuming that a 3 second response time period is acceptable. Each receiver 26 in each RDM 22 wakes every three seconds for a very short period of time to listen for any possible transmitter data message.

Each receiver 26 current is 7 mA (5 mA Rx, +0.5 mA uP, +1 mA analog+0.5 mA miscellaneous).

Each receiver needs approximately 8ms to wake up and stabilize and needs approximately 4 ms to antenna-switch between diverse antennae and make a stay-awake or return-to-sleep decision. Assuming that a worst case allowable relative time shift between the transmitter and receiver ticks is 2 ms, therefore the stability of the oscillator crystals of the clocks in the transmitter and receiver must be such as to ensure 2 ms over the period between sync messages.

Assuming that the sync message is approximately 88 bits (5 byte preamble, 3 byte site ID, 1 byte message type, 2 byte CRC), i.e. "on" time is 8.8 ms at the preferred data rate. So, to comply with a preferred 2 second per hour target, there can be a maximum of 227 sync messages per hour, i.e. the periodicity is 16 seconds.

An accuracy of 2 ms over 16 seconds is 126 ppm maximum, say 60 ppm at the transmitter and 60 ppm at the receiver.

Each receiver 26 average current is 14 ms/3 s×7 mA=33 uA.

Assume false starts occur 1 per minute, a false start consumes 20 ms, i.e. average 20 ms/60 s×7 mA=2.3 uA.

The sync message average current is 20 ms/32 s×7 mA=3.5 uA.

Assume a loss of synchronization once per hour, which requires opening the receiver window to four times its normal width to resynchronize, or to transmit a resynchronize request, i.e. average current 80 ms/3600×7 mA=0.2 uA.

Therefore the total average current is 40 uA, i.e. 350 mAhr/year.

Note that in many instances, it may be preferred to transmit more than one sync message contiguously to ensure redundancy against interference or noise, so for example if the message was sent twice, the sync message length would increase to 17.6 mSec, and the resultant number of sync transmissions per hour would be 114, with a period of 32 seconds, and a total crystal tolerance of 63 ppm, (30 ppm in the transmitter and 30 ppm in the receiver).

A AA battery 24 cell capacity is approximately 1.8 Ahr, suggesting a possible life for a wireless keypad RDM of approximately 5 years.

While several embodiments and variations of the present invention for a synchronizing RF system are described in detail herein, it should be apparent that the disclosure and teachings of the present invention will suggest many alternative designs to those skilled in the art.

Having thus described our invention, what we claim as new and desire to secure by Letters Patent is:

1. A security alarm system comprising:
    at least one battery powered wireless keypad comprising a Radio Frequency (RF) receiver and a reduced display module, the reduced display module providing an accurate display of the present status of the security alarm system; and
    an AC powered control panel comprising a RF transmitter comprising a means for transmitting first periodic sync signals over short durations and with a periodicity such that a total of all of the first periodic sync signals over a period of one hour are equal to or less than a total of 2 second on-air time per hour, the first periodic sync signals being received and used by the RF receiver to maintain proper synchronization of the receiver with the RF transmitter during second periodic wake up windows for possible transmissions of data, and means for transmitting data during at least some of the second periodic wake up windows for the transmission of data;
    wherein the receiver wakes periodically to receive first periodic sync signals which are used by the receiver to maintain the receiver properly synchronized with the transmitter during the second periodic wake up windows for possible transmissions of data from the transmitter;
    wherein the receiver wakes periodically for a short duration at the start of each second periodic wake up window to receive a possible transmission of data, and if no transmission is received goes back to sleep, and if a transmission is received stays awake to receive the full transmission of data, such that the average current consumed by the battery powered receiver to wake periodically to receive the first periodic sync signals to maintain synchronization and to wake periodically to listen for the possible second periodic transmissions of data is less than the average current required to maintain the receiver awake continuously; and
    wherein the transmitter and receiver each further comprise clocks, the clocks in the transmitter and receiver having no more than a 2 millisecond time shift relative to each other.

2. The system of claim 1, wherein the means for transmitting during the second periodic wake up windows transmits with a periodicity of 3 seconds, such that the average response time of the battery powered receiver to changes reflected by the transmissions of data is less than 1.5 seconds on average and no greater than 3 seconds in the worst case.

3. The system of claim 1, wherein the receiver further comprises a primary battery cell of less than 2 amp-hour capacity which operates for more than 3 years before the battery is discharged.

4. The system of claim 1, wherein the transmitter transmits periodic RF messages comprising the present status of the security alarm system to the reduced display module to provide a display of the current status of the security alarm system.

5. A method of synchronizing a security alarm system comprising at least one battery powered wireless keypad comprising a Radio Frequency (RF) receiver and a reduced display module, and an AC powered control panel comprising an RF transmitter, the method comprising:
    transmitting, by the transmitter, first periodic sync signals over short durations and with a periodicity such that a total of all of the first periodic sync signals over a period of one hour are equal to or less than a total of 2 second on-air time per hour, which are received and used by the receiver to maintain proper synchronization of the receiver with the transmitter during second periodic wake up windows for possible transmissions of data, wherein the transmitter and receiver each comprise clocks, the clocks in the transmitter and receiver having no more than a 2 millisecond time shift relative to each other;
    transmitting, by the transmitter, data during at least some of the second periodic wake up windows for the possible transmission of data;
    waking the receiver periodically to receive the first periodic sync signals which are used by the receiver to maintain the receiver properly synchronized with the transmitter during the second periodic wake up windows for possible transmissions of data from the transmitter;
    waking the receiver periodically for a short duration at the start of each second periodic wake up window to receive a possible transmission of data, and if no transmission is received putting the receiver to sleep, and if a transmission is received keeping the receiver awake to receive the full transmission of data, such that the average current consumed by the battery powered receiver waking periodically to receive the first periodic sync signals to maintain synchronization and waking periodically to listen for the possible second periodic transmissions of data is less than the average current required for keeping the receiver awake continuously, and
    displaying on the reduced display module an accurate display of the present status of the security alarm system.

6. The method of claim 5, wherein the periodicity of the second periodic wake up windows is 3 seconds, such that the average response time of the battery powered receiver to changes reflected by the transmissions of data is less than 1.5 seconds on average and no greater than 3 seconds in the worst case.

7. The method of claim 5, further comprising operating the receiver with a primary battery cell of less than 2 amp-hour capacity for more than 3 years before the battery is discharged.

8. The method of claim 5, further comprising transmitting periodic RF messages comprising the present status of the security alarm system to the reduced display module to provide a display of the current status of the security alarm system.

* * * * *